United States Patent
Burke

(10) Patent No.: US 6,799,994 B2
(45) Date of Patent: Oct. 5, 2004

(54) CORD MANAGEMENT APPARATUS AND METHOD

(75) Inventor: Paul C. Burke, Lake Forest, IL (US)

(73) Assignee: Telefonix, Inc, Waukegan, IL (US)

( * ) Notice: Subject to any disclaimer, the term of this patent is extended or adjusted under 35 U.S.C. 154(b) by 43 days.

(21) Appl. No.: 10/145,358

(22) Filed: May 14, 2002

(65) Prior Publication Data

US 2002/0189842 A1 Dec. 19, 2002

Related U.S. Application Data

(63) Continuation of application No. 09/039,825, filed on Mar. 16, 1998, now Pat. No. 6,386,906.

(51) Int. Cl.$^7$ .............................................. H01R 13/72
(52) U.S. Cl. ...................................... 439/501; 439/505
(58) Field of Search ............................... 439/501–502, 439/505–508, 568.1–568.2

(56) References Cited

U.S. PATENT DOCUMENTS

| 5,124,685 A | * | 6/1992 | Rankin | 340/568.2 |
| 6,236,435 B1 | * | 5/2001 | Gertz | 348/373 |
| 6,386,906 B1 | * | 5/2002 | Burke | 439/501 |

* cited by examiner

Primary Examiner—Lincoln Donovan
(74) Attorney, Agent, or Firm—Grossman & Flight, LLC

(57) ABSTRACT

A cord management apparatus that provides for the convenient management of cords associated with the retail display of small electronic devices such as video cameras. The apparatus comprises a multi-conductor cable, a retractable reel for dispensing and retracting the cable, a mounting member for mounting the electronic device, an adapter for connecting the cable to the electronic device, and a base member for removably holding the mounting member. The base member is fastened to a display rack or counter. A plurality of adapters are provided so that the apparatus may be used with a wide variety of devices that may have different connection requirements.

11 Claims, 3 Drawing Sheets

CORD MANAGEMENT APPARATUS AND METHOD

This is a continuation of U.S. Ser. No. 09/039,825 filed Mar. 16, 1998, now U.S. Pat. No. 6,386,906 granted May 14, 2002.

FIELD OF THE INVENTION

The present invention relates to the retail display of electronic devices. More particularly, the present invention relates to the management and organization of cables associated with the retail display of handheld electronic devices.

BACKGROUND OF THE INVENTION

In a retail setting, small electronic devices are often displayed in an operative manner allowing for their demonstration. This manner of display allows for the device to be picked up and used by a potential customer. Handheld video cameras, for example, will often be placed along a counter in operative mode to be picked up and brought to a potential customer's eye for demonstration.

This type of retail display and demonstration of video cameras and the like can be demanding. In order for the camera to be operable, it must be connected to several signal sources. Multiple individual cables are necessary to make these electrical connections to remote power and other input/output signal sources. Also, insuring that the camera is not stolen may require an additional cable. The presence of so many cables can lead to a disorganized, irregular, and haphazard appearance; qualities that do not lend themselves to customer confidence.

Furthermore, as the cameras are removed from their display position and moved about as they are tested and demonstrated by potential customers, the various cables connected to it need to be extended and subsequently retracted as the device is returned from use. If they are not extended and retracted in an effective manner, the cables will tend to knot and tangle and thereby render movement (and hence the demonstration of) the camera difficult or impossible. Clearly this is a most disadvantageous result in a retail display setting.

The task of managing and organizing the required cables and connections is made even more difficult as retail displays of cameras and the like typically include several different devices manufactured by different manufacturers. It is not uncommon, for instance, for an electronics retailer to display 10 or more video cameras for sale. These different cameras may each utilize different type connectors, meaning that each will require entirely different cables and connection jacks. Spares of each of the many individual cables and jacks must also be kept on hand in case of failure. If spares are not kept, the failure of a cable or jack will render a demonstration unit inoperable. Maintaining this large number of spares adds expense for the retailer.

Likewise, each time a camera is to be installed or moved from one display location to another all of its associated individual cables must likewise be installed or moved. Because of their individual requirements, the task of installing, maintaining, and moving the displayed cameras is not straightforward and may require the attention of a skilled technician, further adding to associated costs.

Also, it would be advantageous to have an indication of when a potential customer picks up a camera. For example, for marketing purposes an audio tape highlighting features of that particular camera may be triggered and played. With this information marketers could also determine which displayed cameras were most or least appealing to potential customers. For maintenance and security purposes, one could record when. and for how long a particular camera was in use. Also, should a camera be vandalized or stolen, having a record of when it was in use could be valuable in identifying and apprehending suspects. At present, no efficient apparatus or method exists to meet this industry need.

Finally, maintaining effective but discrete security of the displayed cameras can be difficult. As the primary purpose of the display is to allow potential customers to test and demonstrate the handheld cameras, they need be moveable and operable, complicating effective security. One approach has been to secure the camera to a chain or a high strength cable tether. This interferes with the camera's freedom of movement, however, and results in an unattractive and unappealing retail display. Another option is to provide a continuous security circuit to the camera. If the circuit is broken or otherwise interrupted, an alarm is sounded. This, however, has the disadvantage of adding yet another cable to an already numerous and difficult to manage grouping of cables.

An unresolved need therefor exists for an organized, efficient, secure, and easily maintained cable management system to be used for the retail display of several different cameras or other electronic devices.

OBJECTS OF THE INVENTION

It is an object of the invention to provide a cable management system which will use a single cable to replace the required several individual cables to be used for the display of electronic devices such as cameras.

It is a further object of the invention to provide a cable management system which provides for effective dispensing and retracting of a cable associated with the movement of cameras and the like during their retail display.

It is a further object of the invention to provide a single cable management system which provides for easy adaptation to differing cameras and the like with differing connection and power requirements.

It is a further object of the invention to provide a cable management system which is easily operated and maintained.

It is a further object of the invention to provide a cable management system which provides for discrete and effective anti-theft security.

It is a further object of the invention to provide a cable management system which provides for detection of camera use.

It is a further object of the invention to provide a cable management system which provides for an attractive, organized retail display of cameras and the like.

It is a final object of the invention to provide a facile method for mounting electronic devices with differing connection requirements to a single cable management system.

SUMMARY OF THE INVENTION

The present invention comprises a cable management system for organizing and managing cables associated with the retail display and demonstration of electronic devices, which facilitates easy and interchangeable use with a variety of different electronic devices having differing connection requirements in a retail display setting. The cable management system comprises a base member, a mounting member, a cable reel, a cable, and a modular adapter. The mounting member is adapted to be mounted to the camera or other electronic device. The base member has a fastener for fastening it to a display rack, display counter, or the like. Each of the base member and the mounting member are equipped with a respective one of a mating pair of support couplings so that the mounting member may be removably attached to and supported on the base member. An electronic device to be displayed thus may be removed from the base member and moved about as a customer demonstrates and tries out the device.

As the electronic device such as a camera must be electrically connected during its display and demonstration, one or more cables are connected to the camera. To eliminate the need for several different cables carrying such different signals as power, video, and other required signals, a single cable comprising multiple individual conductors is utilized. The cable is partially stored on a retractable reel which provides for automatic extension and retraction of the cable as the device such as a camera is picked up and moved about during customer demonstration. In this manner cable knots and tangles are avoided, and the cable is neatly managed.

The cable has at its first end a multiple element connector to connect to an electronic signal source box at the display counter. The signal source box will provide all required source signals to the cable, which may include video, power, and other source signals. The cable has at its second end a second multiple element connector for connecting signals to a modular adapter.

The modular adapter carries the signals such as power from the cable to the camera, other signals such as video from the camera to the cable, and a security circuit. The modular adapter has at its first end a multiple element connector to mate with the second connector at the cable second end. The second end of the modular adapter is provided with connection jacks as required by an individual electronic device, such as a camera. A plurality of modular adapters are provided, each adapted for connection to various different cameras A modular adapter suitable for a given electronic device is chosen and used to connect the device to the cable management unit cable. The modular adapters may be color coded or otherwise organized to indicate which device they are to be used with.

In this manner the single cable management unit of the invention can be used with any of a variety of different electronic devices with differing connection requirements. This eliminates the need for changing several required cables when moving devices between display positions, and thereby allows for substantially easier and quicker device movement and installation than previously allowed.

In addition to supplying the device such as a camera with required signals, a preferred embodiment of the cable management unit also provides discrete but effective anti-theft security. An anti-theft electronic circuit is carried by one of the cable's multiple conductors. Should the cable be unplugged or cut in an attempt to steal the electronic device, the anti-theft circuit will be opened thereby setting off an alarm. This mode of anti-theft security replaces the cumbersome and unsightly cables or chains which may have been used in the past.

In the preferred invention embodiment, the base member has a vertical tubular arm with the cable passing through its center. The mounting member has a corresponding tubular portion for receiving the base member tubular arm. The mounting member is removably attached to the base member arm when its tubular portion is slid over the base member arm.

The preferred embodiment of the invention also includes detection means for detecting when the mounting member is removed from the base member. This allows for a marketing audio recording to be triggered upon the camera being picked up It may also be useful to record when and for how long a camera was in use for purposes of security and maintenance. A preferred detection means comprises a light sensor housed in the preferred base member tubular arm. The light detector is inactive when the mounting member is in place covering the base member arm and thereby the detector. When the electronic device, e.g. camera, is in use, the mounting member is removed from the base member, thereby exposing the detector to ambient light. A circuit is then activated indicating that the camera is in use. The light detector conductors are preferably carried by the first end of the cable, but are spliced into the cable so as to bypass the retractable reel.

A preferred embodiment of the invention is configured for the display of one of multiple different video cameras. In this embodiment, the cable comprises video, plural DC power, and anti-theft circuit conductors. The cable reel in this embodiment is preferably attached to the base member.

The cord management unit of the invention is installed within a display counter in a preferred manner such that the retractable cord reel is below the counter surface and hidden from customer view. The base member mounting arm may protrude upwards from the retractable cord reel through an aperture in the display counter, with the cable passing from the cord reel through the mounting arm hollow center.

The preferred fastener for fastening the base member to a display rack comprises an upper locking ring along the preferred tubular arm cooperating with a lower locking shoulder along the preferred arm. The lower locking shoulder is generally elliptical in shape. The mounting member is positioned in a display rack having two opposing ledges defining an elongated slot The lower elliptical locking shoulder has a minor axis dimension that is narrower than the width of the slot, while its major axis dimension is longer than the width of the slot. The upper locking ring has a diameter that is larger than the slot width. The distance between the upper locking ring and the lower locking shoulder is such that the edges of the display slot may be fixably but removably engaged between the two locking members.

To lock the base member in position, the base member is rotated 90° such that the locking shoulder is oriented so that the ledges are thereby engaged between the upper and lower locking members, thereby locking the opposing ledges between the locking ring and locking shoulder. When the base member is again rotated 90° so that the locking shoulder length is substantially parallel to the length of the slot, the base member is no longer fixed in place and is freely moveable along the slot length.

The invention has been described in reference to a preferred embodiment. It is understood that the description of the preferred embodiment is not intended to limit the invention in any manner. Other embodiments and applications of the invention will be obvious to those skilled in the art. For instance, it is clear that although the invention has been described as useful in the retail display of video cameras, the apparatus and method of the invention could also be used in the display of other electronic devices such as computers, headphones, microphones, calculators, and the like.

DETAILED DESCRIPTION OF THE PREFERRED EMBODIMENT

Figure 1:
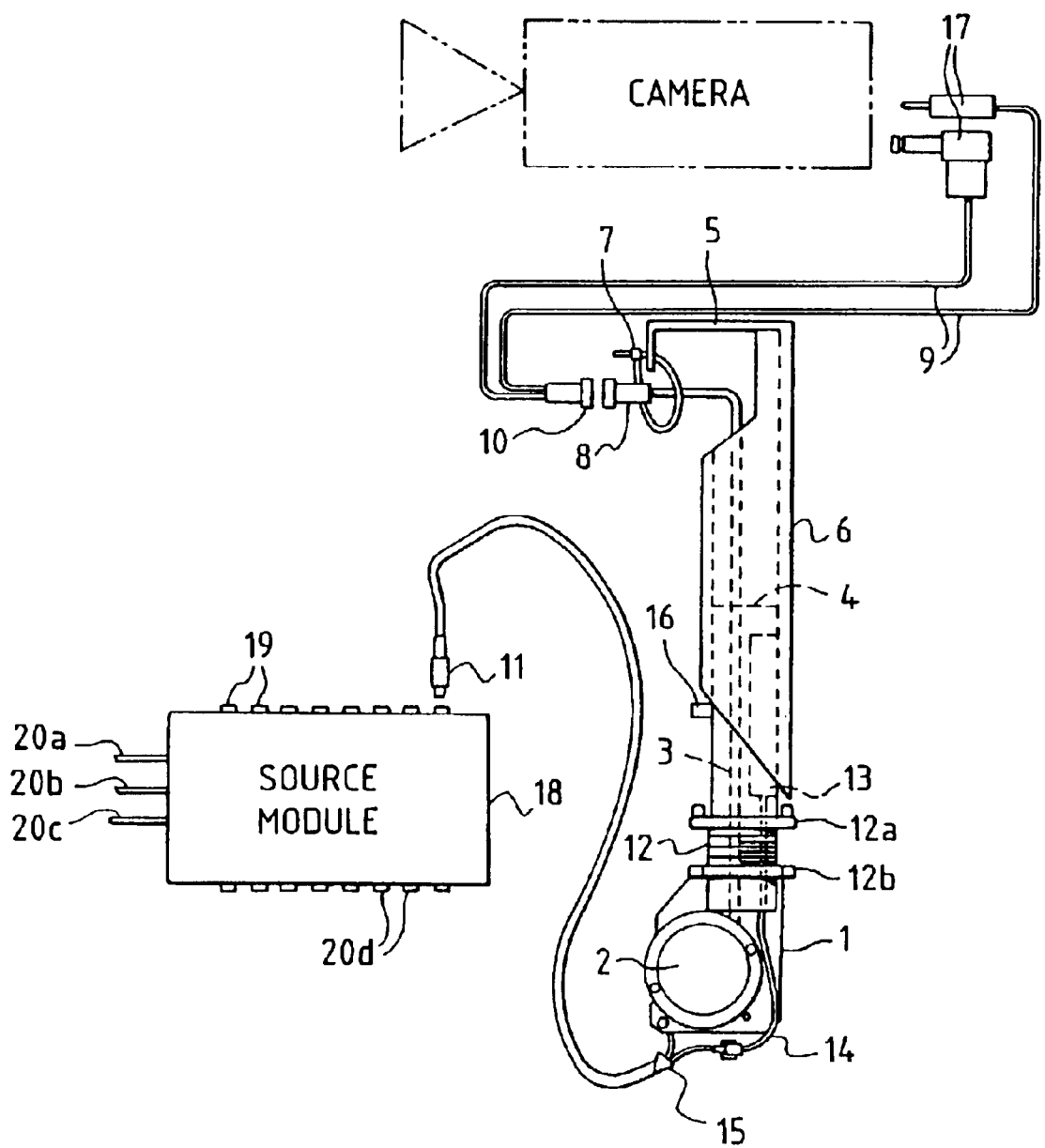
FIG. 1 is a schematic of a preferred embodiment of the invention adapted to video camera display, with the mounting member supported in place on the base member.
Figure 2:
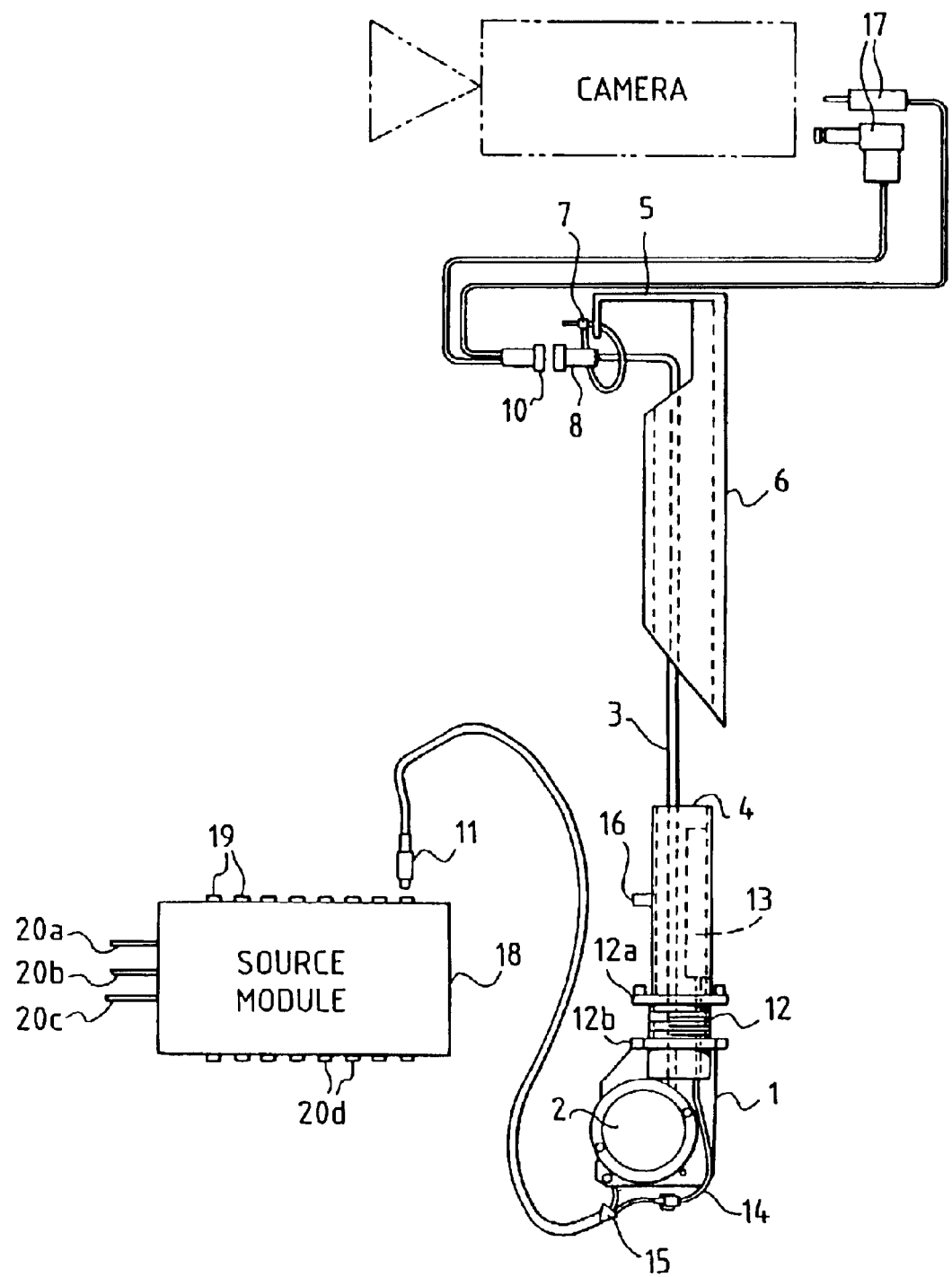
FIG. 2 is a schematic of a preferred embodiment of the invention adapted to video camera display, with the mounting member removed from the base member.

FIGS. 1 and 2 show a preferred embodiment of the invention for mounting a video camera to a display rack; with the mounting member positioned in place on the base member in FIG. 1, and the mounting member removed from the base member in FIG. 2.

A base member 1 has a cord reel 2 retractably storing a portion of cable 3. Cord reel 2 is preferably constructed in accordance with the teachings or U.S. Pat. No. 5,094,396 to Paul Burke, the present inventor, to subject matter of which is hereby incorporated by reference. Provided, however, that reel 2 preferably does not include a ratchet mechanism.

Base member 1 has a hollow tubular arm 4 through which cable 3 passes. A mounting member 5 has a tubular portion 6, which cooperates with base member tubular arm 4 to removably hold mounting member 5. A pin 16 fixes the height at which mounting member 5 is held on base member arm 4. Cable 3 passes through mounting member tubular portion 6, and is mechanically connected to mounting member 5 by a tie wrap 7. As the mounting member 5 with attached camera is removed from base member arm 4 and moved about by prospective customers, cable 3 will be automatically and conveniently extended and retracted by reel 2.

Although the described preferred embodiment utilizes a base member tubular arm portion and a cooperating mounting member tubular portion to removably attach the mounting portion to the base portion, it is understood that other means of removably fastening the mounting member to the base member are anticipated.

In the preferred embodiment, cable 3 comprises several conductors including video, plural DC power supplies, and a security circuit. In this manner the single cable 3 replaces several individual cables previously required for displaying cameras and the like. The security circuit of cable 3 comprises an electronic circuit which will be opened if cable 3 should be cut or disconnected, as would occur during a shoplifting attempt. If the security circuit is opened, an alarm will automatically sound.

Figure 6:
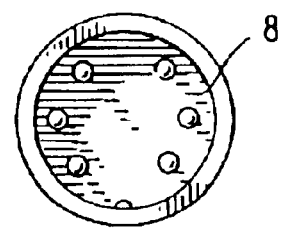
FIG. 6 is a view of a preferred cable second end connector.

FIG. 6 shows a six conductor connector 8 at the second end of cable 3 for connection to a modular adapter 9. Two of these six conductors carry both the video signal and a security circuit. One of the six is a neutral or ground conductor. The remaining three conductors carry 3.6 V, 6 V. and 9 V, respectively, as different video cameras may require one of these voltages. It is understood that although the preferred connector 8 comprises 6 conductors, a connector utilizing fewer or more conductors could easily be substituted as required.

Modular adapter 9 has a connector 10 at its first end cooperating with cable connector 8, and a plurality of connectors 17 at its second end for connection to the camera (or other electronic device). Connectors 17 are configured as required for a given camera or electronic device. If the camera is to be replaced with a different camera having different connection requirements, an alternate modular adapter 9 can be used. In this manner only the adapter needs to be changed, and cable 3 need not be changed when a camera is replaced, thereby greatly reducing the time and effort required for moving different cameras amongst displays.

Figure 5:
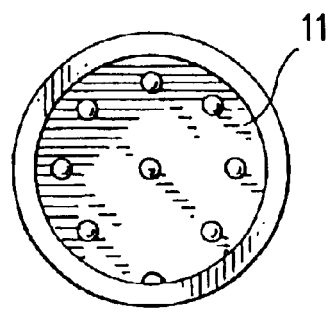
FIG. 5 is a view of a preferred cable first end connector.

FIG. 5 shows an eight conductor connector 11 located at the first end of cable 3 to connect to a source module 18, with the source module 18 to receive and transmit input and output source signals. In the preferred embodiment, six of the eight conductors are the same as in FIG. 6, with the remaining two conductors carrying a circuit for light sensor 13. It is understood that although the preferred connector 11 comprises eight conductors, a connector utilizing more or fewer conductors could easily be substituted as required. The source module 18 may be equipped to provide multi-conductor input and output connections 19 for a plurality of individual cable management apparatuses. Also, the source module 18 may be wired to carry various input and output signals as required.

In the preferred embodiment of the invention, the source module 18 is wired to carry a plurality of power signals (e.g., 36 V, 60 V and 90 V), an anti-theft circuit, a light detector circuit, and a video circuit. The source module 18 is also configured to provide various output connections to carry signals to other devices; connector set 20d for carrying video to monitors, connector 20a for carrying security to a security system, connector 20b for carrying an electric eye circuit, and connector 20c for power input. The source module 18 may be designed and constructed to provide these connections in manners known to those skilled in the art.

The preferred embodiment in FIGS. 1 and 2 also includes a detecting means 13 for detecting the presence/absence of mounting member 5. The preferred detecting means is a light sensor which will be activated by the presence of ambient light when the tubular portion 6 of mounting member 5 is removed from base member arm 4, and deactivated when tubular portion 6 is present and thereby covers the light sensor 13. The sensor input/output signals are carried in a cord 14 which joins cable 3 at a breakout connector 15. Connector 11 then connects the detecting means signal with its input/output source.

Figure 3:
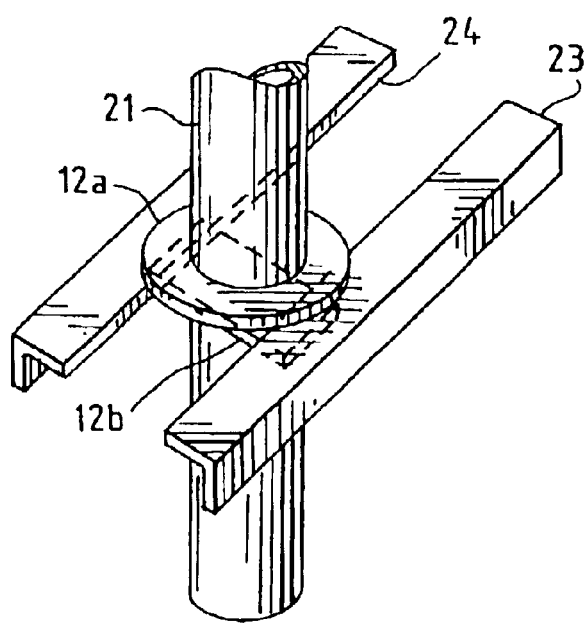
FIG. 3 is a perspective view of a partial cross section of a preferred base member fastener attached to a display rack.
Figure 4:
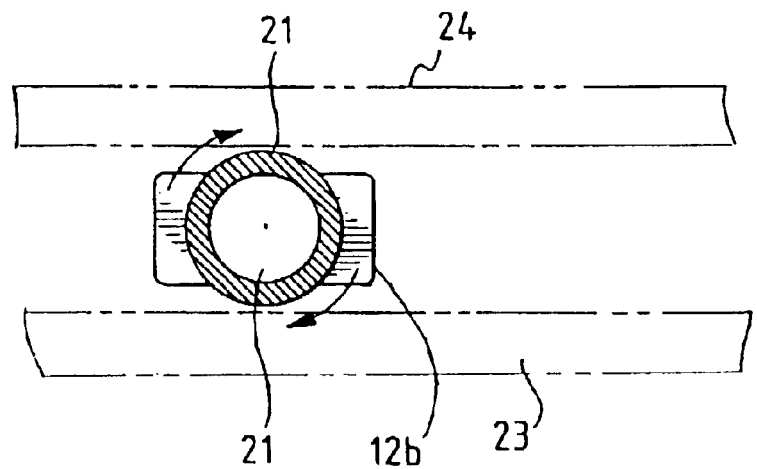
FIG. 4 is a plan view in partial cross section of the preferred base member attached to a display rack.

Referring now to FIGS. 3 and 4, base member 21 has a preferred fastener comprising an upper locking ring 12a and cooperating lower locking shoulder 12b. A display mount may be configured as depicted in FIG. 3 with two opposing ledges 23 and 24 defining an elongated slot. Lower locking shoulder 12b is generally elliptical in shape, with a major axis dimension that is greater than the width of the elongated slot, and with a minor axis dimension that is smaller than the width of the slot. Upper locking ring 12a has a diameter that is larger than the width of the slot. The distance between upper locking ring 12a and lower locking shoulder 12b is substantially the same as the thickness of the opposing ledges 23 and 24. In this manner base member 21 may be rotated so that the major axis of locking shoulder 12b intersects opposing ledges 23 and 24, which will be thereby be fixably engaged between locking ring 12a and locking shoulder 12b holding base member 21 in place, as depicted in FIG. 3. Alternatively, base member 21 may be rotated so that locking shoulder 12b is oriented with its major axis parallel to the axis of the slot, thereby disengaging ledges 23 and 24 and allowing base member 21 to be removed from the display or moved to another location along the slot. This orientation is depicted in FIG. 4 from below locking ring 12a. Also in the preferred embodiment, upper locking ring 12a is threaded onto member 21 as best shown in FIGS. 1 and 2. Thereby locking ring 12a may be rotated to clamp ledges 23 and 24 between locking members 12a and 12b.

Although various preferred embodiments of the invention have been described, it will be obvious and clear to those skilled in the art that several alternative embodiments of the invention may be made. The above description of a preferred embodiment is in no way intended to limit the scope of this disclosure to preclude inclusion of other obvious equivalent embodiments.

What is claimed is:

1. A cable management apparatus for use with a plurality of electronic devices, comprising:
   a first cable assembly having a length, a modular connector, and a plurality of electrical conductors;
   a reel that retractably stores at least a portion of the length of the first cable assembly;
   a mounting member adapted to receive an end of the first cable assembly and at least one of the plurality of electronic devices; and
   a second cable assembly from a plurality of cable assemblies associated with the plurality of electronic devices, wherein the second cable assembly is adapted to electrically couple the at least one of the plurality of electronic devices to the end of the first cable assembly, and wherein the first cable assembly is configured to be electrically coupled to each of the plurality of cable assemblies via the modular connector.

2. A cable management apparatus as defined in claim 1, wherein the first cable assembly is adapted to convey at least one of a power signal and a security signal.

3. A cable management apparatus as defined in claim 1, wherein the plurality of electrical conductors is adapted to carry a plurality of different supply voltages associated with the plurality of electronic devices.

4. A cable management apparatus as defined in claim 1, wherein the plurality of electrical conductors is adapted to carry a security signal.

5. A cable management apparatus as defined in claim 1, wherein the plurality electronic devices includes at least one camera.

6. A cable management apparatus as defined in claim 1, further including a base that holds the reel and that is adapted to be mounted to a surface associated with a product display.

7. A cable management apparatus as defined in claim 1, wherein each of the plurality of cable assemblies associated with the plurality of electronic devices includes a connector adapted to mate with one of the plurality of electronic devices.

8. A cable management system, comprising:
   a plurality of retractable cable assemblies, each of which includes a length, a modular connector, a multi-conductor cable, and a retractable reel on which at least a portion of the length at the multi-conductor cable is wound; and
   a plurality of modular cable assemblies, each of which is associated with at least one of a plurality of electronic devices and each of which includes a first end adapted to be electrically coupled to the multi-conductor cable and a second end adapted to be electrically coupled to one or more of the plurality of electronic devices, wherein each of the plurality of retractable cable assemblies is configured to be electrically coupled to each of the plurality of modular cable assemblies via the modular connector.

9. A cable management system as defined in claim 8, wherein each of the multi-conductor cables is adapted to curry a plurality of electrical signals including at least one of a power signal and a security signal.

10. A cable management system as defined in claim 8, wherein each of the plurality of retractable cable assemblies is adapted to be electrically coupled to at least one of a power source and a security unit.

11. A cable management system as defined in claim 8, wherein each of the plurality of retractable cable assemblies is adapted to be mounted to a surface associated with a product display.

* * * * *